UNITED STATES PATENT OFFICE.

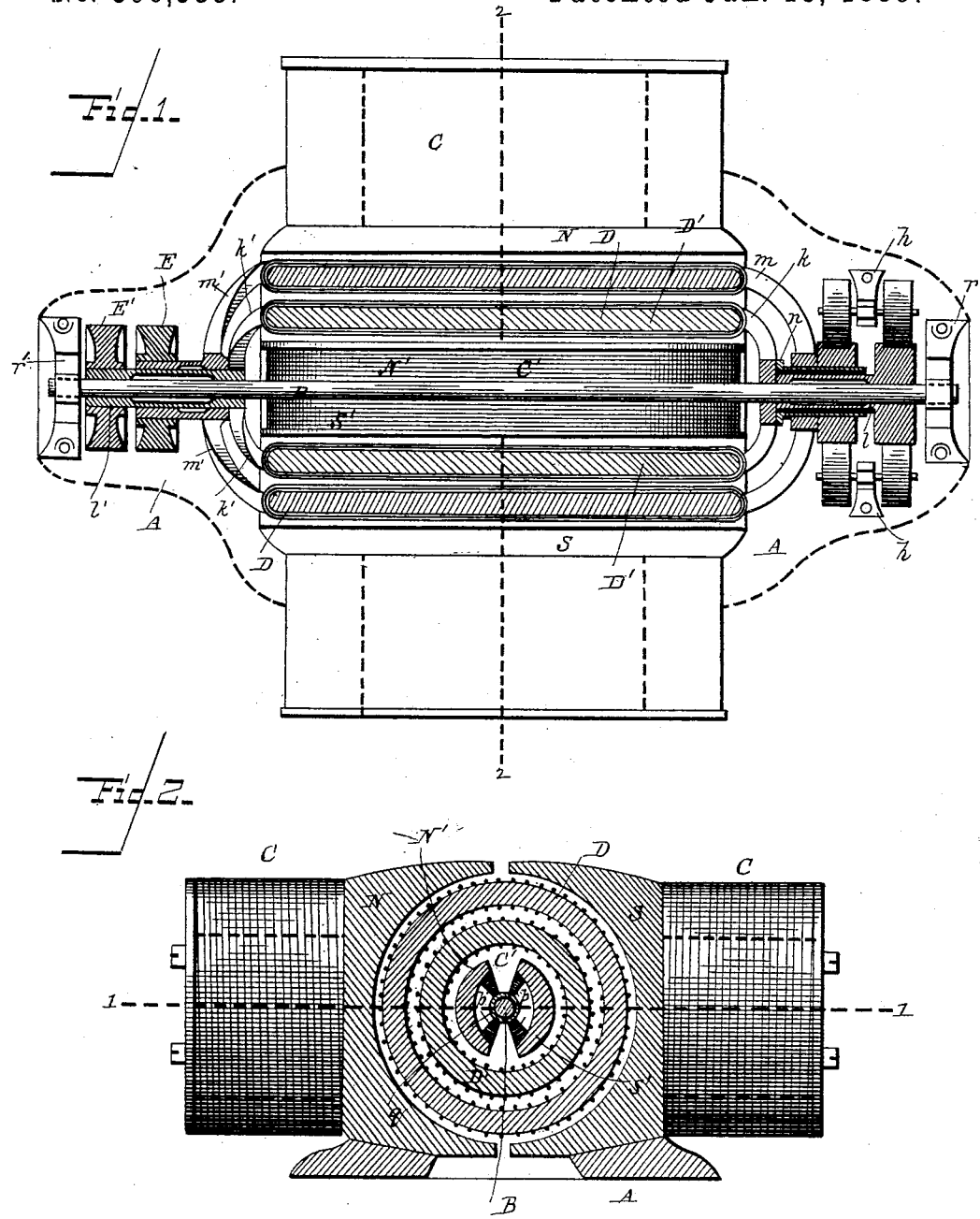

ISAAC T. DYER, OF CHICAGO, ILLINOIS, ASSIGNOR OF FIVE-EIGHTHS TO PETER FISH AND GUSTAV MOURATH, OF SAME PLACE, AND GEORGE C. EWING, JR., OF ENFIELD, MASSACHUSETTS.

DYNAMO-ELECTRIC MACHINERY.

SPECIFICATION forming part of Letters Patent No. 396,355, dated January 15, 1889.

Application filed February 7, 1888. Serial No. 263,292. (No model.)

*To all whom it may concern:*

Be it known that I, ISAAC T. DYER, a citizen of the United States, residing at Chicago, in the county of Cook and State of Illinois, have invented a new and useful Improvement in Dynamo-Electric Machines, of which the following is a specification.

My invention relates to the class of machines used for transforming mechanical work into electricity.

The object of my improvement is to provide a machine of the class referred to having a much greater generating capacity than other dynamo-electric machines of the same size, thereby affording a very compact machine capable of generating in a given time a much larger quantity of electricity than other machines of its size.

My invention consists in a dynamo-electric machine having two sets of magnets and movable armatures, one within the other; and it further consists in details of construction and combinations of parts.

In the drawings, Figure 1 is a sectional plan view of my improved machine, the sectional portion being taken where the broken line 1 1 is shown to extend in Fig. 2. Fig. 2 is a side elevation of the same, partly sectional, the sectional portion being taken where the broken line 2 2 is shown to extend in Fig. 1.

A is the frame or supporting base of the machine, provided near opposite ends with bearings $r$ and $r'$ for the ends of a stationary shaft, B, which I prefer to make hollow.

C is a magnet, either of the permanent kind or an electro-magnet, as shown, the poles N and S being on opposite sides of the shaft. A sleeve, $q$, surrounds the shaft B and is stationary thereon between the poles of the magnet C', and carries radial arms $p$, rigidly supporting the opposite poles, N' and S', of a magnet, C', which, as in the case of the magnet C, may be permanent, as shown, or an electro-magnet.

D is a rotary armature comprising a hollow cylinder of soft iron wound with insulated wire and supported around the shaft B, adjacent to the poles of the magnet C, from loose sleeves $n$ and $n'$ on the shaft near its opposite ends by arms $m$ $m'$, projecting from the sleeves near their inner ends and secured to the ends of the armature, whereby rotation of the sleeves $n$ and $n'$, which is produced by power applied to a pulley, E, on the sleeve $n'$, rotates the armature D in front of the poles N and S. A similar armature, D', is supported within the armature D from loose sleeves $l$ and $l'$, extending through the sleeves $n$ and $n'$ around the shaft B, from arms $k$ and $k'$, projecting from the inner ends of the sleeves toward the adjacent ends of the armature D', to which they are secured, rotation of the sleeves $l$ and $l'$ to actuate the armature connected with them being effected through the medium of a pulley, E', secured upon the sleeve $l'$ between the pulley E and bearing $r'$.

The other parts of the machine—as the commutator and the brushes $h$ and their connections—are the same as in other dynamo-electric machines, and are not therefore herein shown and described in detail.

To actuate the machine, power is applied to the pulleys E and E' to rotate them in the same or in opposite directions, either being equally effectual, and through them the armatures D and D', whereby electricity is produced by each set of generators and led off in the usual manner for use.

Any of the usual means—such as fans—may be provided to counteract the heat developed by the rapidly-succeeding magnetizations and demagnetizations of the armatures in motion.

What I claim as new, and desire to secure by Letters Patent, is—

1. In a dynamo-electric machine, the combination of two sets of magnets and movable armatures, one set within the other, substantially as described.

2. In a dynamo-electric machine, in combination with the frame A, a stationary shaft, B, a magnet, C, having its poles on opposite sides of the shaft, a magnet, C', secured on the shaft between the poles of the magnet C, and movable armatures D and D', supported from the shaft B and actuated, respectively, in front of the poles of the magnets C and C', substantially as described.

3. In a dynamo-electric machine, in combination with the frame A, a stationary shaft, B, a magnet, C, having its poles on opposite sides of the shaft, a magnet, C', secured on the shaft between the poles of the magnet C, and hollow cylindrical rotary armatures D and D', supported one within the other around the shaft and actuated, respectively, in front of the poles of the magnets C and C', substantially as described.

4. In a dynamo-electric machine, in combination with the frame A, a shaft, B, rigidly supported on the frame, a magnet, C, having its poles on opposite sides of the shaft, a magnet, C', secured on the shaft between the poles of the magnet C, loose rotatory sleeves $n$ and $n'$, near opposite ends of the shaft, carrying between them a hollow cylindrical armature, D, surrounding the shaft and magnet C' and extending between the poles of the magnet C, and loose rotatory sleeves $l$ and $l'$, near opposite ends of the shaft, carrying between them a hollow cylindrical armature, D', inside the armature D, surrounding the magnet C', substantially as described.

5. In a dynamo-electric machine, in combination with the frame A, a shaft, B, rigidly supported on the frame, a magnet, C, having its poles on opposite sides of the shaft, a magnet, C', secured on the shaft between the poles of the magnet C, loose rotatory sleeves $n$ and $n'$, near opposite ends of the shaft, having arms $m$ and $m'$, carrying between them a hollow cylindrical armature, D, surrounding the shaft and magnet C' and extending between the poles of the magnet C, and loose rotatory sleeves $l$ and $l'$, extending through the sleeves $n$ and $n'$ on the shaft, and having arms $k$ and $k'$, carrying between them a hollow cylindrical armature, D', inside the armature D, surrounding the magnet C', substantially as described.

ISAAC T. DYER.

In presence of—
J. W. DYRENFORTH,
CHAS. E. GAYLORD.